(12) United States Patent
Kandemir et al.

(10) Patent No.: US 11,275,381 B2
(45) Date of Patent: Mar. 15, 2022

(54) CONTROL AND MONITORING OF PHYSICAL SYSTEM BASED ON TRAINED BAYESIAN NEURAL NETWORK

(71) Applicant: Robert Bosch GmbH, Stuttgart (DE)

(72) Inventors: Melih Kandemir, Stuttgart (DE); Manuel Haussmann, Heidelberg (DE)

(73) Assignee: Robert Bosch GmbH, Stuttgart (DE)

( * ) Notice: Subject to any disclaimer, the term of this patent is extended or adjusted under 35 U.S.C. 154(b) by 198 days.

(21) Appl. No.: 16/831,174

(22) Filed: Mar. 26, 2020

(65) Prior Publication Data
US 2020/0326718 A1    Oct. 15, 2020

(30) Foreign Application Priority Data
Apr. 9, 2019  (EP) .................................. 19168151

(51) Int. Cl.
| | |
|---|---|
| *G06K 9/62* | (2006.01) |
| *G05D 1/02* | (2020.01) |
| *G05B 13/02* | (2006.01) |
| *G05D 1/00* | (2006.01) |
| *G06N 3/04* | (2006.01) |
| *G06N 3/08* | (2006.01) |

(52) U.S. Cl.
CPC .......... *G05D 1/0221* (2013.01); *G05B 13/027* (2013.01); *G05D 1/0088* (2013.01); *G06K 9/6256* (2013.01); *G06K 9/6278* (2013.01); *G06K 9/6296* (2013.01); *G06N 3/0472* (2013.01); *G06N 3/08* (2013.01); *G05D 2201/0216* (2013.01)

(58) Field of Classification Search
CPC .............. G05D 1/0221; G05D 1/0088; G05D 2201/0216; G05B 13/027; G05B 13/029; G05B 13/042; G05B 13/048; G06K 9/6256; G06K 9/6278; G06K 9/6296; G06N 3/0472; G06N 3/08; G06N 3/0427; G06N 5/022

USPC ................. 382/156; 345/173–178, 156–157; 715/863

See application file for complete search history.

(56) References Cited

U.S. PATENT DOCUMENTS 9,582,080 B1 *  2/2017  Tilton ..................... G06F 3/015

OTHER PUBLICATIONS

Feng, et al.: "Towards Safe Autonomous Driving: Capture Uncertainty in the Deep Neural Network For Lidar 30 Vehicle Detection", (2018), pp. 1-10.
Dziugaite and Roy: "Computing Nonvacuous Generalization Bounds for Deep (Stochastic) Neural Networks with Many More Parameters than Training Data", (2017), pp. 1-14.
Khalidov and Hansard: "Chapter 5—Neural Networks" in Bishop C.M. "Pattern Recognition and Machine Learning", (2006), pp. 1-23.
Sun, et al.: "Functional Variational Bayesian Neural Networks" (2019), UCLR paper; pp. 1-22.

(Continued)

*Primary Examiner* — Charlotte M Baker
(74) *Attorney, Agent, or Firm* — Norton Rose Fulbright US LLP; Gerard Messina

(57) ABSTRACT

A trained model is described in the form of a Bayesian neural network (BNN) which provides a quantification of its inference uncertainty during use and which is trained using marginal likelihood maximization. A Probably Approximately Correct (PAC) bound may be used in the training to incorporate prior knowledge and to improve training stability even when the network architecture is deep.

15 Claims, 3 Drawing Sheets

(56) References Cited

OTHER PUBLICATIONS

Kendall, A. and Gal, Y., "What Uncertainties Do We Need in Bayesian Deep Learning for Computer Vision?", in NIPS, 2017, pp. 1-12. https://arxiv.org/abs/1703.04977.
Wu, A., et al., "Fixing Variational Bayes: Deterministic Variational Inference for Bayesian Neural Networks," in ICLR, 2019, pp. 1-24. https://arxiv.org/abs/1810.03958.

* cited by examiner

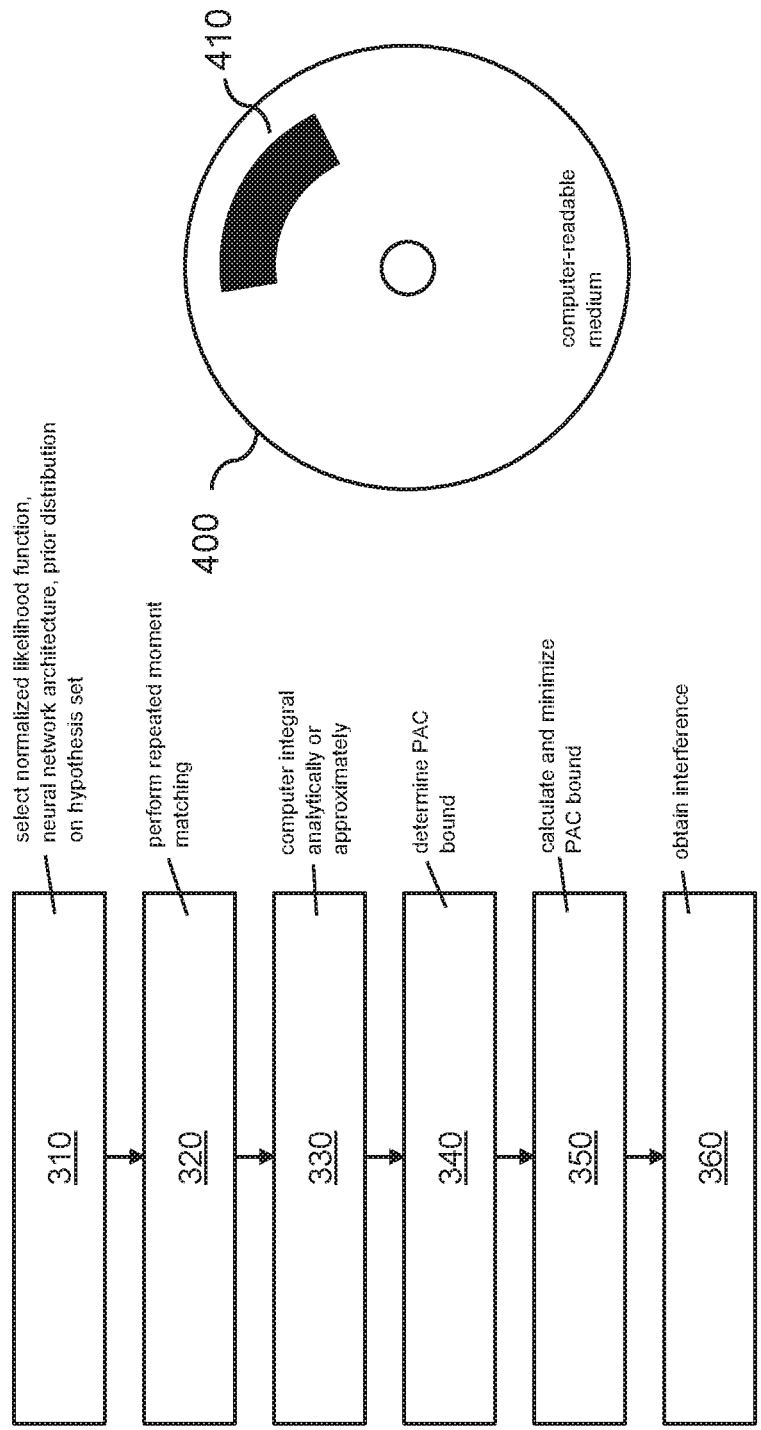

CONTROL AND MONITORING OF PHYSICAL SYSTEM BASED ON TRAINED BAYESIAN NEURAL NETWORK

CROSS REFERENCE

The present application claims the benefit under 35 U.S.C. § 119 of European Patent Application EP 19168151.9 filed on Apr. 9, 2019, which is expressly incorporated herein by reference in its entirety.

FIELD

The present invention relates to a training system and computer-implemented training method for training a neural network for use as a trained model in controlling or monitoring a physical system. The present invention further relates to an inference system and computer-implemented inference method for controlling or monitoring the physical system using the trained model. The present invention further relates to a computer-readable medium comprising data of the trained model, and to a computer-readable medium comprising data representing instructions arranged to cause a processor system to perform at least one of the computer-implemented methods.

BACKGROUND INFORMATION

Physical systems are increasingly controlled based on inferences which are obtained from machine learned ('trained') models. Such physical systems are also referred to as computer-controlled systems, and include robots, vehicles, domestic appliances, power tools, manufacturing machines, access control systems, building heating systems and the like. Such physical systems may operate in an environment, which may for example be a warehouse in case of warehouse robots or a road network in case of autonomous vehicles. A machine learnable model may be trained to infer a state of the environment and/or a state of the physical system based on one or more sensor measurements which relate to said state and which may be obtained from sensors in the environment or in the physical system.

In the example of an autonomous vehicle (being an example of a physical system), a model may be trained to infer a relative position (being an example of a state of the physical system relative to the environment) with respect to other vehicles on the road based on sensor measurements obtained from video, radar and/or lidar sensors integrated into the autonomous vehicle. Another example is a heating system (a physical system) for a building, in which it may be desirable to determine the temperature (a state of the environment) using sensor data obtained from a temperature sensor. Yet another example is an electric motor (a physical system), in which it may be desirable to determine the rotor's position (a state of the physical system) based on sensor data obtained from a position feedback sensor.

Having inferred the state of the environment and/or of the physical system, the physical system may be controlled to operate based on the inferred state. In the aforementioned example of an autonomous vehicle, the trained model may be used to control the steering and the braking of the autonomous vehicle based on the inferred relative position of the autonomous vehicle with respect to other vehicles. Another example is that of a computer-controlled combustion engine, in which the trained model may be used to control the operation of the combustion engine based on an inferred state of the combustion engine, which may for example be inferred from sensor data from temperature, position and/or pressure sensors.

Such a trained model may also enable monitoring of a physical system. For example, the model may be trained and subsequently used to infer an undesired state or an undesired output of the physical system so that a warning signal may be issued to warn a user or an operator of the physical system of the inferred undesired state or output. A specific example is that a model may be trained to warn a driver if the autonomous vehicle is predicted to steer off course or hit a pedestrian.

In such control and monitoring applications, it is increasingly seen as crucial to not only provide an inference but also a quantification of the uncertainty of the inference. In particular, uncertainty quantification is seen as crucial in safety-critical applications, where rejecting to make an inference and/or rejecting to take a default action under excessive unsureness may be preferred. For example, an inference which infers a steering action of an autonomous vehicle to avoid an obstacle may be rejected if the certainty that the inferred steering action actually avoids the obstacle is low. Such uncertainty quantification may also be used to detect if the trained model is applied to out-of-distribution inputs, e.g., inputs having characteristics which were not or under-represented in the training data of the trained model. This may be the case if the trained model is applied to other type of input data than for which it was trained, or when the input data has been modified, e.g., due to an adversarial attack, or when the input data is corrupted, etc.

Conventionally, Bayesian neural networks (BNN) are used to provide an inference and a quantification of the uncertainty of the inference. Differently from 'vanilla' neural networks, BNNs have stochasticity on their synaptic weights, in that the weights are assigned a probability distribution. This enables quantification of the inference uncertainty. For example, the standard deviation of the posterior predictive distribution of a BNN may be used as a quantitative and principled measure of the uncertainty of the inference, or the confidence in the inference.

Due to their stacked structure, BNNs propagate inferences uncertainty through the hidden layer(s), and hence can support complicated uncertainty models. However, exact inference of such a highly nonlinear system may not only be analytically intractable but also hard to approximate with sufficiently high precision.

Reference [1], Kendall, A. and Gal, Y. "*What Uncertainties Do We Need in Bayesian Deep Learning for Computer Vision?*" in NIPS, 2017, https://arxiv.org/abs/1703.04977, describes a technique to train a BNN using Monte Carlo Dropout-based sampling. Reference

[2], Wu, A., Nowozin, S., Meeds, E., Turner, R., Hernandez-Lobato, J., and Gaunt, A. "*Fixing Variational Bayes: Deterministic Variational Inference for Bayesian Neural Networks*" In ICLR, 2019, https://arxiv.org/abs/1810.03958, describes a deterministic Bayesian inference method which uses variational inference. Disadvantageously, the techniques described by both references are prone to inaccurate posterior distribution approximations under deep BNN architectures. Disadvantageously, reference [1] requires inference-time sampling, of which the computational cost is prohibitive for deep BNN architectures.

SUMMARY

It may be desirable to enable control or monitoring of a physical system based on a model which is trained to provide a quantification of its inference uncertainty during use and which is trainable and trained to be more accurate with respect to the posterior distribution approximations for deep architectures.

In accordance with a first aspect of the present invention, an example training system and an example computer-implemented training method are provided for training a neural network for use as a trained model in controlling or monitoring a physical system. In accordance with a further aspect of the present invention, an example inference system and an example computer-implemented inference method are provided for controlling or monitoring a physical system using the trained model. In accordance with a further aspect of the present invention, an example computer-readable medium is provided comprising a trained Bayesian neural network. In accordance with a further aspect of the present invention, an example computer-readable medium is provided.

The above measures provide a trained model in the form of a Bayesian neural network (BNN) for use in controlling or monitoring a physical system. As explained in the background section, the BNN is trained on training data comprising sensor measurements and associated states of the environment and/or the physical system. However, instead of training the model using Monte Carlo Dropout-based sampling or variational inference, the BNN is trained using marginal likelihood maximization.

Specifically, the weights of the BNN are integrated-out to obtain a marginal likelihood function of the Bayesian neural network. Such integrating-out of the weights of the BNN may refer to calculating the integral of the joint probability distribution of the variables in the BNN with respect to its weights. The outcome may be a probability distribution of only the input and output observations, which is no longer dependent on the weight distributions. In other words, after integration, the BNN may no longer have latent variables. The probability distribution may represent the marginal likelihood function of the BNN.

In accordance with the present invention, the marginal likelihood function is maximized to tune hyperparameters of priors of the integrated-out weights of the Bayesian neural network, and thereby obtain a trained Bayesian neural network. Specifically, the marginal likelihood function is maximized by minimizing a loss function which comprises a data fit term expressing a fit to the training data, and a regularization term which provides a regularization to reduce (risk of) overfitting.

Unlike the training using Monte Carlo Dropout-based sampling or variational inference or similar techniques, in accordance with the present invention, the marginal likelihood maximization is better suited for deep BNN architectures, and thereby for deep BNNs, as marginal likelihood maximization allows more accurate posterior distribution approximations under deep BNN architectures and thereby obtains a trained model which is more accurate. In other words, the model trained by the present invention may be more accurate given the same constraints, e.g., in terms of computational complexity of the training. It is also not needed to use inference-time sampling, which would be prohibitive for deep BNN architectures.

Having trained the model using marginal likelihood maximization, the trained model may be used to control or monitor the physical system. In particular, the inference and its uncertainty may be used to generate output data for an output device for controlling or monitoring the physical system. Such output data may take various forms, such as control data or display data, depending on the type of output device. For example, the output device may be an actuator which is part of, or located in a vicinity of the physical system. The output data may be used to control the actuator, and thereby the physical system. In other examples, the output device may be a rendering device which is configured to generate a sensory perceptible output signal based on the output data of the inference system. For example, the rendering device may be a display configured to display the output signal. Other types of sensory perceptible output signals include, but are not limited to, light signals, auditive signals, tactile signals, etc. Corresponding rendering devices are conventional. Based on the sensory perceptible output signal, an operator may then control the physical system. For example, the sensory perceptible output signal may denote a failure in a component of the physical system, which may prompt an operator to control the physical system by stopping or pausing its operation. Another example is that the trained model may be used in a driver assistance system which uses the trained model to inform the driver of relevant objects in the visual scene ahead.

In general, the output data may be generated not only as a function of the inference itself, but also of its inference uncertainty. For example, an inference having a higher inference uncertainty may result in other output data, e.g., other value(s) thereof, than the same inference having a lower inference uncertainty. For example, the output data may comprise more "conservative" values, e.g., reduced in magnitude, if the inference uncertainty is high. Such conservativeness may relate to a safety aspect associated with the physical system. For example, if the inference uncertainty is high, actions which are considered less safe may be avoided. For example, the output data may be generated to command a steering action in an autonomous vehicle in case the inference uncertainty for the inference on which the steering action is based is relatively low, while the output data may be generated to command no steering action (e.g., maintaining course) if the inference uncertainty for the inference is relatively high. Various other ways of generating output data as a function of an inference and its inference uncertainty are possible as well.

Optionally, the processor subsystem is configured to recursively integrate out the weights of the Bayesian neural network from an input layer to an output layer of the Bayesian neural network. Calculating the marginal likelihood function by analytical calculation is not tractable. Instead, an approximate calculation may be used, in which the weights of the BNN are recursively integrated out from an input layer to an output layer of the BNN. Such an approximate calculation has been shown using the Central Limit Theorem (CLT) to obtain an approximation which is tight enough to be used as accurate in practice.

Optionally, the processor subsystem is configured to recursively integrate out the weights of the Bayesian neural network using progressive moment matching based on the first moment and the second moment of the respective probability distribution of each of the weights. Here, the first moment may refer to the mean and the second moment may refer to the variance of the respective probability distributions of the weights, with the first moment and the second moment together providing an approximation of the probability distribution as a normal distribution which, when recursively integrated out, obtains a sufficiently tight approximation.

Optionally, the input interface is configured to access prior knowledge data representing a prior knowledge-based model of a relation between the inputs and the outputs of the physical system, and the processor subsystem is configured to train the model to incorporate prior knowledge of the physical system by incorporating the prior knowledge-based model in the regularization term of the loss function. When using marginal likelihood maximization, the prior hyperparameters are occupied for model fitting ("model" referring here and elsewhere to a Bayesian model represented by the BNN, unless otherwise noted). It would therefore be desirable to obtain a mechanism for a domain expert to incorporate prior knowledge into the Bayesian model, such as physical law(s) which at least in part define the relation between sensor measurements and the state of the environment and/or the state of the physical system, so that only residual factors in said relation may need to be learned from the training data. Surprisingly, the regularization term of the loss function is definable such that such prior knowledge may be taken into account. Therefore, unlike references 1 and 2, the BNN may be trained to take such prior knowledge into account by using a regularization term which incorporates the prior knowledge.

For example, the regularization term may be defined to comprise a probabilistic model representing the prior knowledge. In a specific example, the prior knowledge may represent the thermodynamic laws, which when applied to a particular case, may translate into a differential equation system $dy/dx = g(y,x)$. This differential equation system may be translated into a probabilistic model as follows. Firstly, the differential equation system may be solved to obtain a plain equation system, being in essence a function that maps x to y, i.e., $y=f(x)$. This function may represent prior knowledge on the relation between inputs and outputs, but may not explain all dynamics in this relation. However, the unexplained part of the relation may be modelled as residual noise, for example Gaussian noise with zero mean and variance v. Thereby, y is no longer a deterministic function of x but is a random variable that comes from a normal distribution with mean $f(x)$ and variance v.

Optionally, the regularization term is a probably approximately correct (PAC) bound. Without a regularization term, there is a risk of overfitting when maximizing a marginal likelihood function as the resultant loss function is both non-linear and may have a large number of free parameters, and since the prior hyperparameters are occupied for model fitting, the Bayesian model also does not provide any mechanism for a domain expert to incorporate prior knowledge into the model. Both drawbacks may be addressed by using as the regularization term a Probably Approximately Correct (PAC) bound that introduces a principled complexity term into the marginal likelihood function.

Optionally, the loss function is defined by Eq. (5) of this specification.

Optionally, the physical system may comprise the inference system. As such, the inference system may be a subsystem of the physical system.

In accordance with an abstract, it is noted that physical systems are increasingly controlled based on inferences which are obtained from machine learned ('trained') models. Examples of such physical systems include computer-controlled systems such as robots, vehicles, domestic appliances, power tools, manufacturing machines, access control systems, building heating systems and the like. A model is described in the form of a Bayesian neural network (BNN) which provides a quantification of its inference uncertainty during use and which is trained using marginal likelihood maximization. A Probably Approximately Correct (PAC) bound may be used in the training to incorporate prior knowledge and to improve training stability even when the network architecture is deep. Thereby, a more accurate trained model is obtained, enabling the physical system to be more accurately controlled and monitored.

It will be appreciated by those skilled in the art that two or more of the above-mentioned embodiments, implementations, and/or optional aspects of the present invention may be combined in any way deemed useful.

Modifications and variations of any system, any computer-implemented method or any computer-readable medium, which correspond to the described modifications and variations of another one of said entities, can be carried out by a person skilled in the art on the basis of the present description.

BRIEF DESCRIPTION OF THE DRAWINGS

These and other aspects of the present invention are explained below with reference to the example embodiments and with reference to the figures.

FIG. 4 shows various steps of a training a model.

FIG. 5 shows a computer-readable medium comprising data.

DETAILED DESCRIPTION OF EXAMPLE EMBODIMENTS

Figure 1:
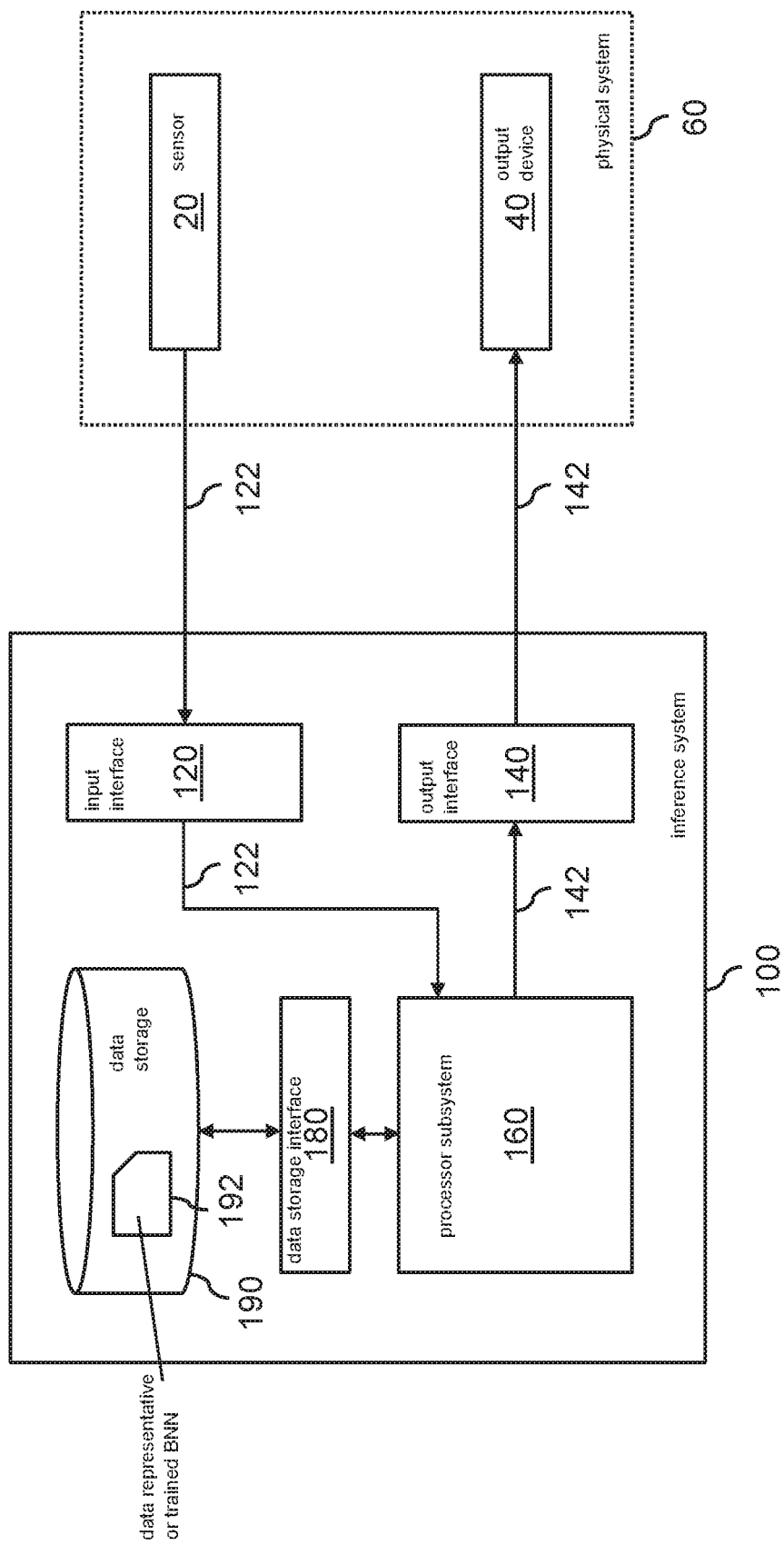
FIG. 1 shows an inference system for, using a trained model, controlling or monitoring a physical system which operates in an environment.

It should be noted that the figures are purely diagrammatic and not drawn to scale. In the figures, elements which correspond to elements already described may have the same reference numerals.

FIG. 1 shows an inference system for, using a trained model, controlling or monitoring a physical system which operates in an environment, wherein the model is trained to infer a state of the environment or the physical system based on sensor measurements and to provide a quantification of its inference uncertainty during use, and wherein the inferred state and its inference uncertainty are used to generate output data for an output device which is used in the controlling or monitoring of the physical system, such an actuator or a rendering device.

LIST OF REFERENCE NUMBERS

The following list of reference numbers is provided for facilitating the interpretation of the figures and shall not be construed as limiting.

Figure 2:
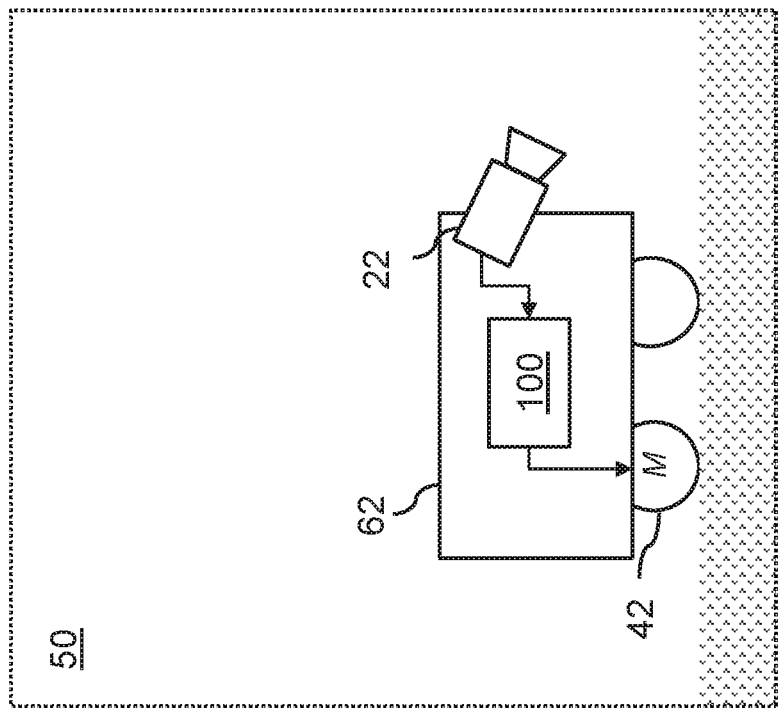
FIG. 2 shows an autonomous vehicle incorporating the inference system to control the steering and the braking of the autonomous vehicle based on sensor measurements obtained from a video camera integrated into the vehicle.

20 sensor
22 video camera
40 output device
42 actuator (electric motor)
50 environment
60 physical system
62 autonomous vehicle
100 inference system using a trained BNN
120 input interface
122 sensor data
140 output interface
142 output data 160 processor subsystem
180 data storage interface
190 data storage
192 data representation of trained BNN
200 training system for training a BNN
220 input interface
240 processor subsystem
290 data storage
292 data representation of (trained) BNN
294 training data
310 select normalized likelihood function, neural network architecture, prior distribution on hypothesis set
320 perform repeated moment matching
330 compute integral analytically or approximately
340 determine PAC bound
350 calculate and minimize PAC bound
360 obtain inference
400 computer-readable medium
410 non-transitory data The following relates to training a model and using the trained model to control or monitor a physical system operating in an environment. Specifically, the model is trained to infer a state of the environment and/or the physical system based on one or more sensor measurements and to provide a quantification of its inference uncertainty during use. FIGS. 1 and 2 relate the use of such a trained model, e.g., to control an autonomous vehicle, while FIGS. 3 and 4 relate to the training.

FIG. 1 shows an inference system 100 for controlling or monitoring a physical system 60 operating in an environment. For legibility reasons, FIG. 1 does not explicitly show the environment, and the physical system 60 is only shown schematically as a dashed outline. In general, such a physical system may be a physical entity such as a vehicle, robot, etc., or a connected or distributed system of physical entities, e.g., a lighting system, or any other type of physical system, e.g., a building. FIG. 1 shows the physical system 60 to comprise a sensor 20 which may measure one or more quantities which correlate with a state of the environment and/or a state of the physical system 60. As shown in FIG. 1, the sensor 20 may be part of the physical system 60. In other examples, the sensor 20 may be arranged remotely from the physical system in the environment, for example if the quantity(s) can be measured remotely. For example, a camera-based sensor may be arranged outside of a robot but may nevertheless measure quantities associated with the robot, such as the robot's position and orientation within a warehouse.

The inference system 100 is shown to comprise an input interface 120 which is shown to access sensor data 122 from the sensor 20. Effectively, the input interface 120 may represent a sensor interface. Alternatively, the input interface 120 may access the sensor data from elsewhere, e.g., from a data storage or a network location. Accordingly, the input interface 120 may have any suitable form, including but not limited to a low-level communication interface, e.g., based on I2C or SPI data communication, but also a data storage interface such as a memory interface or a persistent storage interface, or a personal, local or wide area network interface such as a Bluetooth, Zigbee or Wi-Fi interface or an ethernet or fibreoptic interface.

The inference system 100 is further shown to comprise an output interface 140 to provide output data 142 to an output device 40, which may for example be an actuator 40 which is part of the physical system 60. For example, the actuator may be an electric, hydraulic, pneumatic, thermal, magnetic and/or mechanical actuator. Specific yet non-limiting examples include electrical motors, electroactive polymers, hydraulic cylinders, piezoelectric actuators, pneumatic actuators, servomechanisms, solenoids, stepper motors, etc., etc. In another example, the output device may be a rendering device, such as a display, a light source, a loudspeaker, a vibration motor, etc., etc, which may be used to generate a sensory perceptible output signal which may render the inferred state or a result derived from the inferred state, such as a failure diagnosis or any other type of derived result, e.g., for use in guidance, navigation or other type of control of the physical system. It is noted that although FIG. 1 shows the output device 40 to be part of the physical system 60, this does not need to be the case. Instead, the output device 40 may be arranged outside of the physical system 60 in the environment, but may nevertheless control or allow monitoring of the physical system 60. A specific yet non-limiting example is that the output device 40 may be a traffic light which may be used to control the operation of an autonomous vehicle.

The inference system 100 is further shown to comprise a processor subsystem 160 configured to infer the state of the environment and/or the state of the physical system 60 based on the sensor data 122 accessed via the input interface 120, and to provide output data 142 to the output device 40 to enable the control or monitoring of the physical system 60. For that purpose, the processor subsystem 160 may be configured to access a data representation 192 of a trained Bayesian neural network, use the input data 122 as input to the trained Bayesian neural network to obtain an inference of the state of the environment and/or the state of the physical system 60 as well as a quantification of an inference uncertainty of the inference, and based on the inference and the quantification of the inference uncertainty of the inference, generate the output data 142 for the output device 40.

The inference system 100 may comprise a data storage interface 180 for accessing a data storage 190, which may be a volatile or non-volatile type of data storage, and which may be used to temporarily or persistently store data used by the processor subsystem 160, including but not limited to the data representation of the trained Bayesian neural network 192 and other temporary or persistent data.

It is noted that in some embodiments, the data storage interface 180 and the (sensor) input interface 120 may be a same or same type of interface. In other embodiments, both interfaces may be different types of interfaces, and/or may be sub-interfaces of what is otherwise generally referred to as "input interface".

In general, the inference system 100 may be embodied as, or in, a single device or apparatus, such as a workstation or a server.

The server may be an embedded server. The device or apparatus may comprise one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the processor subsystem of the system may be implemented in the device or apparatus in the form of programmable logic, e.g., as a Field-Programmable Gate Array (FPGA). In general, each functional unit of the inference system 100 may be implemented in the form of a circuit. The inference system 100 may also be implemented in a distributed manner, e.g., involving different devices or apparatuses, such as distributed local or cloud-based servers. In some embodiments, the inference system 100 may be part of the physical system itself, and/or may be represent a control system configured to control the physical system.

FIG. 2 shows an example of the above, in that the inference system 100 is shown to be a control system of an autonomous vehicle 62 operating in an environment 50. The autonomous vehicle 62 may incorporate the inference system 100 to control the steering and the braking of the autonomous vehicle based on sensor measurements obtained from a video camera 22 integrated into the vehicle 62. For example, the inference system 100 may control an electric motor 42 to perform (regenerative) braking in case the autonomous vehicle 62 is inferred to collide with an obstacle. As indicated in the summary section, the inference uncertainty may be used to further control the steering and the braking, in that the confidence in the inference may determine the type of action to be taken, or determine a magnitude (degree) or sub-type of the action to be taken, etc.

Figure 3:
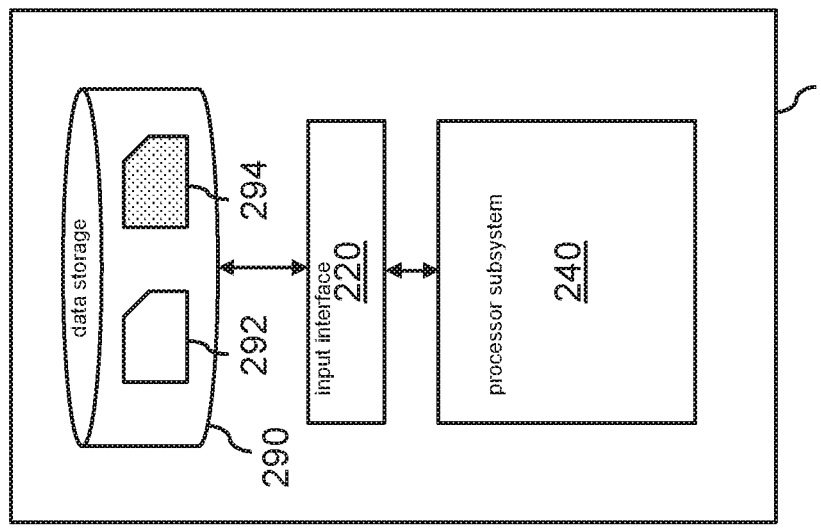
FIG. 3 shows a training system for training a model for use in controlling or monitoring a physical system operating in an environment.

FIG. 3 shows a training system 200 for training a model for use in controlling or monitoring a physical system operating in an environment. The training system 200 is shown to comprise an input interface 220 configured to access model data 292 defining a Bayesian neural network, and training data 294 comprising sensor measurements and associated states of the environment or the physical system. As shown in FIG. 3, the input interface 220 may be a data storage interface 220 to a data storage 290 which comprises said data 292, 294. The data storage interface 220 and the data storage 290 may correspond in terms of type to respectively the data storage interface 120 and the data storage 190 of FIG. 1.

The training system 200 is further shown to comprise a processor subsystem 240 configured to train the Bayesian neural network based on the training data 294 by integrating out weights of the Bayesian neural network to obtain a marginal likelihood function of the Bayesian neural network, and by maximizing the marginal likelihood function to tune hyperparameters of priors of the integrated-out weights of the Bayesian neural network so as to obtain the trained Bayesian neural network. Specifically, the processor subsystem 240 may be configured to maximize the marginal likelihood function by minimizing a loss function which comprises a data fit term expressing a fit to the training data and a regularization term.

Although not explicitly shown in FIG. 3, the system 200 may further comprise an output interface configured to output the trained model data representing the trained Bayesian neural network. In some examples, the input interface 220 may also represent the output interface, and thereby represent an input and output interface 220. In some examples, the model data 292 of the untrained Bayesian neural network may during or after the training be replaced by the model data 292 of the trained Bayesian neural network, in that weights of the Bayesian neural network may be adapted to reflect the training on the training data 294. In some embodiments, the output interface may be the same type of interface as the input interface 120 as described with reference to FIG. 1.

In general, the training system 200 may be embodied as, or in, a single device or apparatus, such as a workstation or a server. The server may be an embedded server. The device or apparatus may comprise one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the processor subsystem of the system may be implemented in the device or apparatus in the form of programmable logic, e.g., as a Field-Programmable Gate Array (FPGA). In general, each functional unit of the training system 200 may be implemented in the form of a circuit. The training system 200 may also be implemented in a distributed manner, e.g., involving different devices or apparatuses, such as distributed local or cloud-based servers.

With further reference to the training of the Bayesian neural network, the following is noted. The training system may train the Bayesian neural network, being a neural network whose synaptic weights follow a probability distribution, by so-called Bayesian model selection. This may involve integrating out all latent variables and maximizing the marginal log-likelihood with respect to its hyperparameters. The training may avoid overfitting under deep architectures, and since the training does not build on the intractable intermediate posterior weight inference step, the training may be more accurate than standard learning approaches such as Variational Inference (VI) and Markov Chain Monte Carlo (MCMC) sampling. Moreover, unlike many prior art approaches, the training is deterministic, and hence does not suffer from distortions of an intermediate sampling step. Finally, the training has been found to be more stable even under deep network architectures if a PAC-Bound based regularization term is used.

The following example describes the training of the model in more detail. However, the actual implementation of the training may be carried out in various other ways, e.g., on the basis of analogous mathematical concepts.

One may consider a supervised learning problem comprised of N input observations $X=\{x_1, \ldots, x_N\}$ and the corresponding N output observations $y=\{y_1, \ldots, y_N\}$. Such input observations may for example represent sensor measurements which may be indicative of a state, e.g., of a physical system and/or its environment, whereas the output observations may represent the state, e.g., as a ground-truth.

A Bayesian neural net (BNN) may be defined as:

$$y \mid X, \theta \sim \prod_{n=1}^{N} p(y_n \mid x_n, \theta_n), \theta \sim \prod_{n=1}^{N} \prod_{i=1}^{V} p(w_i^n \mid \phi)$$

where $p(y|x,\theta)=g(y,f(x,\theta))/Z_g$ may be a likelihood function on i.i.d. (independent and identically distributed) observations (x,y). Here, $f(x,\theta)$ may comprise or consist of V number of synaptic weights $\theta=\{w_1, \ldots, w_V\}$ whose priors may contain a set of hyperparameters collected in set $\phi$. The standard approach in the art may be to first infer $p(\theta|X,y)$ and then perform inference of new data points $(x_*,y_*)$ by calculating the posterior predictive distribution:

$$p(y_*|x_*,X,y)=\int p(y_*|\theta,x_*)p(\theta|X,y)d\theta.$$

A problem with this approach may be that its accuracy preconditions on the accuracy of an intermediate task, namely inference of $p(\theta|X,y)$, which has as many modes as the local minima of a loss function that takes a deterministic neural network as the model. This analytical bottleneck may bring about large divergences from the exact model, leading to suboptimal inference performance in all data sets. By avoiding to solve such an excessively difficult intermediate task, the expected inference performance of the trained model may be increased.

The marginal likelihood function of a BNN may be calculated by integrating out its weights. Doing so by analytical calculation is not tractable. In some embodiments, a tuneably tight approximate calculation may be used, which may be recursive and which may be described and explained as follows.

Assume a neural network with L layers having its weights integrated out up to layer l−1. This may result in the following probabilistic process on the linear activation map of $h_k^l$ of layer l:

$$w_{kj}^l \sim p(w_{kj}^l), h_k^{l-1} \sim p(h_k^{l-1} | x), \forall k = 1, \ldots, K,$$

$$h_j^l = \sum_{k=1}^{K} w_{kj}^l \sigma(h_k^{l-1}),$$

where $\sigma(h_k^{l-1})$ is a nonlinear operator applied on the linear activation map $h_k^{l-1}$ of layer l−1. Using the Central Limit Theorem (CLT), one may show that this process converges to:

$$p(h_j^l | x) \approx \mathcal{N}(h_j^l | m_j^l, s_j^l) \text{ where} \quad (1)$$

$$m_j^l = E\left[\sum_{k=1}^{K} w_{kj}^l \sigma(h_k^{l-1})\right] = \sum_{k=1}^{K} E[w_{kj}^l] E[\sigma(h_k^{l-1})],$$

$$s_j^l = \text{Var}\left[\sum_{k=1}^{K} w_{kj}^l \sigma(h_k^{l-1})\right]$$

$$= \sum_{k=1}^{K} \left(\text{Var}[\sigma(h_k^{l-1})] E[w_{kj}^l]^2 + E[\sigma(h_k^{l-1})]^2 \text{Var}[w_{kj}^l]\right)$$

as K grows (e.g., more neurons are added to the neural network on layer l). Even for K=10, this approximation may be considered to be tight enough to be considered as accurate in practice. The recursive algorithm may be complete when a defined terminating condition is met, e.g., when the mappings are at the input layer l=1. At this stage, $\sigma(h_k^{l-1})$ may be replaced by $x_k$, referring to the $k^{th}$ channel of a deterministic input observation whose first moment is itself and second moment is zero. The rest of the equation may remain the same. As this form of the equation no longer depends on one layer below, the recursion may terminate.

Having all the BNN weights integrated out, one may define a likelihood $p(y|h^L)$ which is suitable to the particular application of the model to be trained and which is a function of $h^L$, e.g., $r(y, h^L)$ subject to a normalization factor $Z_r$:

$$p(y|h^L) = r(y, h^L) / Z_r,$$

$$p(h^L | x) \approx \mathcal{N}(h^L | a_{h^L}(x, \phi), b_{h^L}(x, \phi)),$$

where $a_{h^L}(x, \phi)$ and $b_{h^L}(x, \phi)$ may be the functional mappings resulting from repetitive moment matching from the input layer all the way to the output layer. For many likelihoods, such as normal for regression and Bernoulli for classification, it is possible to integrate out $h^L$ analytically. After this integration, the model no longer has any latent variables, and hence one arrives at the marginal likelihood, which may be maximized with respect to the weight prior hyperparameters as follows:

$$\operatorname*{argmax}_{\phi} \log p(Y | X, \phi) = \sum_{n=1}^{N} \log p(y_n | x_n, \phi) \quad (2)$$

To further improve the stability of the training when $\phi$ comprises or consists of a large number of free variables, which is natural when the neural net architecture is either deep or wide, the following is noted. The overfitting risk in this marginal likelihood maximization problem may stem from the training loss function not having a complexity penalty. Since the prior hyperparameters $\phi$ are occupied for model fitting, the model also does not provide a mechanism for a domain expert to incorporate prior knowledge into the model. Both these weaknesses may be addressed by developing a Probably Approximately Correct (PAC) bound that introduces a principled complexity term into the marginal likelihood maximization based the training loss function given in Equation (2).

One may first define true risk as:

$$R(h) = -E_{x,y \sim \Delta}[p(y|h(x))]$$

and the related empirical risk as $$R_S(h) = -\frac{1}{N} \sum_{n=1}^{N} p(y_n | h(x_n))$$

where h(.) is a predictor drawn from a hypothesis family and $$S = \{(x_1, y_1), \ldots, (x_N, y_N)\}$$

is a draw from the unknown data distribution $\Delta$.

One may also define the below random variable $$B = E_{S \sim \Delta} E_{h \sim P}[e^{ND(R_S(h), R(h))}] \quad (3)$$

where P is a distribution on the space of predictors h(.) that incorporates prior knowledge. In other words, P may represent a probabilistic model which may in turn represent a prior knowledge-based modelling of a relation between for example sensor measurements and associated states, and thereby for example incorporate knowledge on physical laws governing this relation. As also described elsewhere with reference to the example of the relation being governed by thermodynamic laws, such physical laws, or any other (set of) equations, may be expressed as a probabilistic model in a conventional manner.

Applying the standard PAC theorem obtains:

$$Pr\left\{E_{h \sim Q}[R(h)] \leq E_{h \sim Q}[R_S(h)] + \sqrt{\frac{KL(Q \| P) + \log\left(\frac{B}{\delta}\right)}{N}}\right\} \geq 1 - \delta \quad (4)$$

where delta may be a predefined confidence level bound between 0 and 1. For practical purposes, delta may be set to an arbitrarily low probability value, such as 0.1. The following proves that an upper bound exists to the right-hand side of the inequality, and ends up with the logarithm of the marginal likelihood of the training data at the bottom-most line:

$$E_{h^L \sim p(h^L | x)}\left[-\frac{1}{N} \sum_{n=1}^{N} p(y_n | h^L(x_n))\right] < -\frac{1}{N} \sum_{n=1}^{N} \log E_{h^L \sim p(h^L | x)}[p(y_n | h^L(x_n))] =$$

$$-\frac{1}{N}\sum_{n=1}^{N}\log p(y_n\mid x_n).$$

Substituting this inequality into the PAC bound in Equation (4), one may obtain the following training objective, which may be used to train a BNN:

$$-\frac{1}{N}\sum_{n=1}^{N}\log p(y_n\mid x_n)+\sqrt{\frac{KL(Q\|P)+\log\left(\frac{B}{\delta}\right)}{N}} \quad (5)$$

In Eq. (5), the first term may represent a data fit term expressing a fit to the training data, e.g., a fit to input observations $x_n$ and output observations $y_n$, while the second term may represent a regularization term. The regularization term may incorporate prior knowledge via the probabilistic model P being part of said term.

The training algorithm may be considered to be complete if B can be upper bounded. As the likelihood function p(y|h) is assumed proper (e.g., bounded), its maximum may be trivially calculated and used as an upper bound. For example, for normal likelihood $p(y|h)=N(y|h, \beta^{-1})$, one may simply calculate:

$$B\le e^{N(0-\mathcal{N}(\mu,\beta^{-1}))^2}$$

and substitute the right-hand side into Eq. (5), then minimize the resultant objective with respect to φ. For a classification likelihood such as Bernoulli, B is trivially bounded above by one.

FIG. 4 shows various steps of training a model. Step 310 may comprise choosing a proper (e.g., normalized) likelihood function p(y|h), a neural network architecture f(x,θ), and a prior distribution P on the hypothesis set. Step 320 may comprise performing moment matching using Eq. (1) repeatedly to obtain an approximation of the marginal likelihood p(h|a(x),b(x)). Step 330 may comprise computing the integral p(y|x)=∫p(y|h)p(h|a(x),b(x))dh analytically or approximately. Step 340 may comprise determining bound B of Eq (3) implied by p(y|h). Step 350 may comprise calculating the bound in Eq. (5) analytically and determine the optimal φ∗ that minimizes this bound. Step 360 may comprise inferring, that is predicting, a new sample (x*,y*) analytically by p(y∗|x∗,φ∗).

In general, the training may improve on prior art Bayesian Neural Net inference algorithms in one or more of the following aspects. Firstly, marginal likelihood maximization may be used for training, instead of posterior parameter inference. Secondly, in some embodiments, a Probably Approximately Correct (PAC) bound may be used to both incorporate prior knowledge and to improve training stability even when the network architecture is deep. Thirdly, in some embodiments, the PAC bound may be combined with the probabilistic notion of 'likelihood', and therefore both may support principled Bayesian analysis and may provide theoretical generalization performance guarantees prior to test time.

Various applications are possible. For example, the trained model may be applied to various types of sensor data, such as image or video sensor data. In general, the trained model may be used instead of deterministic alternatives in applications where determining inference uncertainty is critical. The trained model may further incorporate prior knowledge via its model parameters and via the form of the trained model. Hence, the trained model may be used to, for example, partially model an observed environment by first-principle physics. For example, a combustion engine may follow the principles of thermodynamics, as well as many other external factors. Time series data may be collected from multiple engine sensors. An image may be constructed from a fixed time window of such sensor data, where time is an axis and the measurement data is another axis. By sliding the window through time, an image sequence may be obtained, e.g., a video. Thereby, the Bayesian neural network may be made applicable to high-dimensional data. The Bayesian neural network may further incorporate the thermodynamics laws as prior knowledge while the remaining residual factors may be learned from training data.

Any method described in this specification may be implemented on a computer as a computer implemented method, as dedicated hardware, or as a combination of both. As also illustrated in FIG. 5, instructions for the computer, e.g., executable code, may be stored on a computer readable medium 400, e.g., in the form of a series 510 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 5 shows an optical disc 400. In an alternative embodiment of the computer readable medium 400, the computer readable medium 400 may comprise transitory or non-transitory data 410 representing a trained model (BNN) as described elsewhere in this specification.

Examples, embodiments or optional features, whether indicated as non-limiting or not, are not to be understood as limiting the present invention.

It should be noted that the above-mentioned embodiments illustrate rather than limit the present invention, and that those skilled in the art will be able to design many alternative embodiments without departing from the scope of the present invention. Use of the verb "comprise" and its conjugations does not exclude the presence of elements or stages other than those stated. The article "a" or "an" preceding an element does not exclude the presence of a plurality of such elements.

Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. Several elements may be embodied by one and the same item of hardware.

What is claimed is:

1. A training system for training a neural network for use as a trained model in controlling or monitoring a robot or vehicle operating in an environment, wherein the model is trained to infer a state of the environment or the robot or vehicle based on one or more video or image sensor measurements and to provide a quantification of its inference uncertainty during use, the training system comprising:

an input interface configured to access model data defining a Bayesian neural network, and training data including video or image sensor measurements and associated states of the environment or the robot or vehicle;

a processor subsystem configured to train the Bayesian neural network based on the training data by:
recursively integrating out weights of the Bayesian neural network from an input layer to an output layer of the Bayesian neural network to obtain a marginal likelihood function of the Bayesian neural network; and
maximizing the marginal likelihood function to tune hyperparameters of priors of the integrated-out weights of the Bayesian neural network so as to obtain a trained Bayesian neural network, wherein the marginal likelihood function is maximized by minimizing a loss function which includes: i) a data fit term expressing a fit to the training data, and ii) a regularization term; and
an output interface configured to output trained model data representing the trained Bayesian neural network.

2. The training system according to claim 1, wherein the processor subsystem is configured to recursively integrate out the weights of the Bayesian neural network using progressive moment matching based on a first moment and a second moment of the respective probability distribution of each of the weights.

3. The training system according to claim 1, wherein:
the input interface is configured to access prior knowledge data representing a prior knowledge-based model of a relation between the video or image sensor measurements and the associated states; and
the processor subsystem is configured to train the model to incorporate prior knowledge of the robot or the vehicle by incorporating the prior knowledge-based model in the regularization term of the loss function.

4. The training system according to claim 3, wherein the prior knowledge-based model includes a modelling of a physical law which at least in part defines a relation between the video or image sensor measurements and the associated states.

5. The training system according to claim 3, wherein the prior knowledge-based model is a probabilistic model.

6. The training system according to claim 1, wherein the regularization term is a probably approximately correct (PAC) bound.

7. The training system according to claim 1, wherein the regularization term penalizes complexity of the Bayesian neural network.

8. An inference system for, using a trained model, controlling or monitoring a robot or vehicle operating in an environment, wherein the model is trained to infer a state of the environment or the robot or vehicle based on one or more video or image sensor measurements and to provide a quantification of an inference uncertainty of the inference, the inference system comprising:
an input interface configured to access input data representing at least video or image sensor measurement, and model data defining a trained Bayesian neural network as obtained by the training system;
an output interface to an output device which is used in the control or the monitoring of the robot or vehicle;
a processor subsystem configured to:
use the input data as input to the trained Bayesian neural network to obtain an inference of a state of the environment or the robot or vehicle and a quantification of an inference uncertainty of the inference, and
based on the inference and the quantification of the inference uncertainty of the inference, generate output data for the output device for controlling or monitoring the robot or vehicle;
wherein the inference system is further configured to, using the output interface, provide the output data to the output device.

9. The interference system as recited in claim 8, wherein the Bayesian neural network is trained by:
recursively integrating out weights of the Bayesian neural network from an input layer to an output layer of the Bayesian neural network to obtain a marginal likelihood function of the Bayesian neural network; and
maximizing the marginal likelihood function to tune hyperparameters of priors of the integrated-out weights of the Bayesian neural network so as to obtain a trained Bayesian neural network, wherein the marginal likelihood function is maximized by minimizing a loss function which includes: i) a data fit term expressing a fit to the training data, and ii) a regularization term.

10. The inference system according to claim 8, wherein the output device is an actuator associated with the robot or vehicle, and wherein the inference system is an inference-based control system configured to control the robot or vehicle by providing control data as the output data to the actuator.

11. The inference system according to claim 8, wherein the output device is a rendering device, wherein the inference system is an inference-based monitoring system configured to monitor an operation of the robot or vehicle and to generate and provide the output data to the rendering device to cause the rendering device to generate a sensory perceptible output signal.

12. A computer-implemented training method for training a neural network for use as a trained model in controlling or monitoring a robot or vehicle operating in an environment, wherein the model is trained to infer a state of the environment or the robot or vehicle based on one or more video or image sensor measurements and to provide a quantification of its inference uncertainty during use, the training method comprising the following steps:
accessing, via an input interface, model data defining a Bayesian neural network, and training data including video or image sensor measurements and associated states of the environment or the robot or vehicle;
training the Bayesian neural network based on the training data by:
recursively integrating out weights of the Bayesian neural network from an input layer to an output layer of the Bayesian neural network to obtain a marginal likelihood function of the Bayesian neural network, and
maximizing the marginal likelihood function to tune hyperparameters of priors of the integrated-out weights of the Bayesian neural network so as to obtain a trained Bayesian neural network, wherein the marginal likelihood function is maximized by minimizing a loss function which includes: i) a data fit term expressing a fit to the training data, and ii) a regularization term; and
outputting, via an output interface, trained model data representing the trained Bayesian neural network.

13. A computer-implemented inference method for, using a trained model, controlling or monitoring a robot or vehicle operating in an environment, wherein the model is trained to infer a state of the environment or the robot or vehicle based on one or more video or image sensor measurements and to provide a quantification of an inference uncertainty of the inference, the inference method comprising the following steps:

accessing, via an input interface, input data representing at least one video or image sensor measurement, and model data defining a trained Bayesian neural network;

using the input data as input to the trained Bayesian neural network to obtain an inference of a state of the environment or the robot or vehicle and a quantification of an inference uncertainty of the inference;

based on the inference and the quantification of the inference uncertainty of the inference, generating output data for an output device which is used in the control or the monitoring of the robot or vehicle; and via an output interface, providing the output data to the output device.

14. The computer-implemented inference method as recited in claim 13, wherein the Bayesian neural network is trained by:

recursively integrating out weights of the Bayesian neural network from an input layer to an output layer of the Bayesian neural network to obtain a marginal likelihood function of the Bayesian neural network; and maximizing the marginal likelihood function to tune hyperparameters of priors of the integrated-out weights of the Bayesian neural network so as to obtain a trained Bayesian neural network, wherein the marginal likelihood function is maximized by minimizing a loss function which includes: i) a data fit term expressing a fit to the training data, and ii) a regularization term.

15. A non-transitory computer-readable medium on which is stored instructions for training a neural network for use as a trained model in controlling or monitoring a robot or vehicle operating in an environment, wherein the model is trained to infer a state of the environment or the robot or vehicle based on one or more video or image sensor measurements and to provide a quantification of its inference uncertainty during use, the instructions, when executed by a processor system, causing the processor system to perform the following steps:

accessing, via an input interface, model data defining a Bayesian neural network, and training data including video or image sensor measurements and associated states of the environment or the robot or vehicle;

training the Bayesian neural network based on the training data by:

recursively integrating out weights of the Bayesian neural network from an input layer to an output layer of the Bayesian neural network to obtain a marginal likelihood function of the Bayesian neural network, and maximizing the marginal likelihood function to tune hyperparameters of priors of the integrated-out weights of the Bayesian neural network so as to obtain a trained Bayesian neural network, wherein the marginal likelihood function is maximized by minimizing a loss function which includes: i) a data fit term expressing a fit to the training data, and ii) a regularization term; and outputting, via an output interface, trained model data representing the trained Bayesian neural network.

* * * * *

UNITED STATES PATENT AND TRADEMARK OFFICE
CERTIFICATE OF CORRECTION

Page 1 of 1

PATENT NO. : 11,275,381 B2
APPLICATION NO. : 16/831174
DATED : March 15, 2022
INVENTOR(S) : Melih Kandemir and Manuel Haussmann It is certified that error appears in the above-identified patent and that said Letters Patent is hereby corrected as shown below:

On the Title Page

In Item (30) Foreign Application Data, replace:
"19168151"

With:
--19168151.9--

Signed and Sealed this
Twenty-eighth Day of June, 2022

Katherine Kelly Vidal
*Director of the United States Patent and Trademark Office*